May 30, 1939.    C. JACKSON    2,160,214
APPARATUS FOR FLUSHING AND REPACKING AUTOMOBILE WHEELS
Filed Nov. 22, 1938
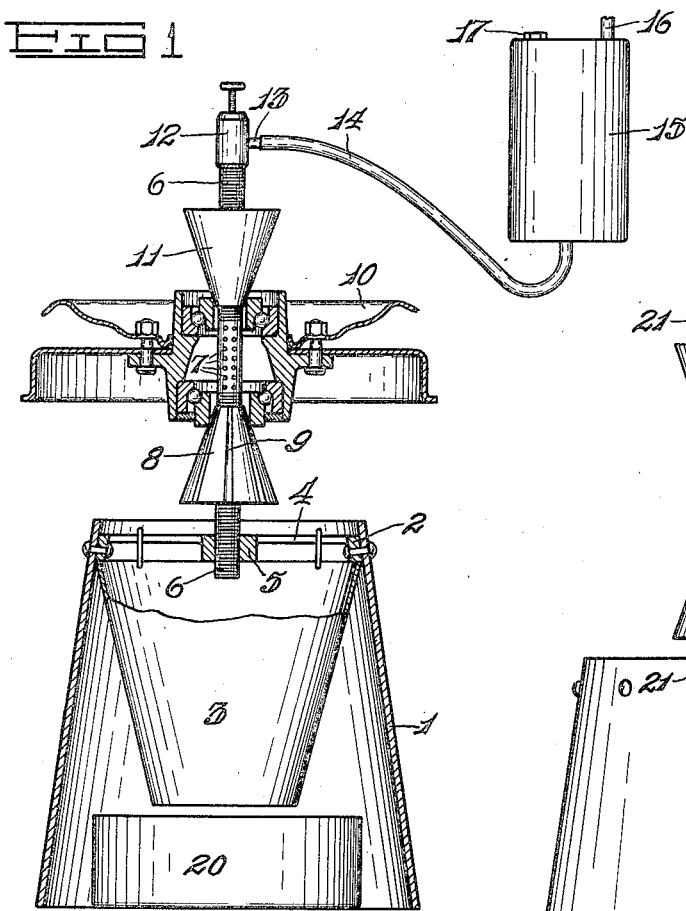
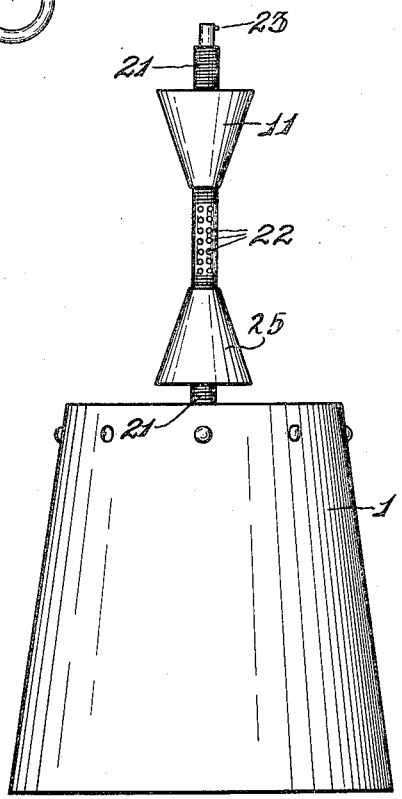
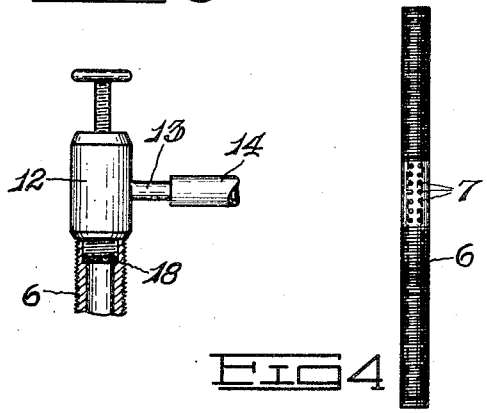
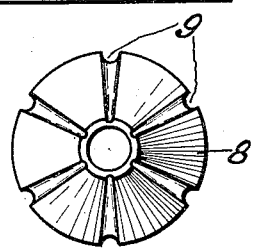
INVENTOR
Cecil Jackson
BY Martin J. Manion
ATTORNEY Patented May 30, 1939

2,160,214

UNITED STATES PATENT OFFICE 2,160,214

APPARATUS FOR FLUSHING AND REPACKING AUTOMOBILE WHEELS

Cecil Jackson, Sardis, Ohio

Application November 22, 1938, Serial No. 241,785

5 Claims. (Cl. 184—1)

This invention relates to a device for efficiently lubricating the front wheels of automobiles.

The present practice of lubricating the front wheels of automobiles permits easy removal of the outer bearing of a wheel for cleaning of old grease and repacking with fresh grease. However, cleaning and repacking of the hub and inner bearing cannot so readily be accomplished because the majority of front wheel constructions include a grease seal or retainer rigidly located exteriorly of the inner bearing. Attempts at removal of these grease seals usually results in complete mutilation of the seals and render the same unfit for further use. Few, if any, automobile service stations or general automobile repair shops carry renewal grease seals in stock because of the vast number of sizes and makes which would be required to service all makes and models of automobiles. Because of this situation, the almost universal practice is to remove the grease by probing. Manifestly, the entire interior surface cannot be conveniently reached and, as a consequence, all of the old grease is not removed. New grease is inserted by means of a putty knife or similar instrument, and there cannot, therefore, be any assurance that the grease has contacted the inner bearing to afford complete lubrication.

The present invention provides an apparatus whereby both the inner and outer bearings, as well as the hub, of a wheel may be efficiently flushed and cleansed to effect complete removal of all of the old lubricant.

Another object of the invention is to provide a device whereby, after flushing, the bearings and hub may be completely repacked with fresh grease to assure satisfactory lubrication.

Another object of the invention is to provide a device whereby the flushing and repacking operations may be accomplished without the necessity of disturbing the grease seal, and with a minimum of labor and time.

With these and other objects in view, the invention resides in the features of construction, arrangement of parts, and combinations of elements, which will hereinafter be described, reference being had to the accompanying drawing, in which:

Figure 1 is a side elevational view, partly in section, of the apparatus with a front wheel in position ready for flushing of the old grease from the hub and wheel bearings;

Figure 2 is a side elevational view of the device as it appears when assembled for repacking the hub and bearings with fresh lubricant;

Figure 3 is an enlarged side elevational detailed view, partly in section, of the operating valve for the flushing liquid;

Figure 4 is a detail view in side elevation of the flushing tube; and

Figure 5 is an enlarged top plan view of the fluted cone used during the flushing operation.

Referring to said drawing, the reference numeral 1 designates a hollow, frusto-conical, sheet metal base. Riveted, or otherwise fastened, to the interior upper edge of the base 1 is a ring 2 from which depends an integral splash shield 3. Extending inwardly from and formed integral with the ring 2 are radially disposed arms 4 whose inner extremities terminate with a diametrically centered nave 5. A pan 20 is housed within the base 1 directly beneath the open bottom of the splash shield 3.

The nave 5 has a threaded central bore adapted to removably receive the lower end of a flushing tube 6. The tube 6 is externally threaded throughout its entire longitudinal extent except for a plain area midway between its ends and which is devoid of threads. The plain area is provided with a plurality of apertures or perforations 7. The upper end of the tube is open, while the bottom end is closed.

Threadedly received on the lower portion of the tube 6 is a cone 8, said cone having a plurality of spaced flutes 9 in its surface. The wheel 10, whose bearings and hub are to be lubricated, is located about the tube 6 so that the race of the inner bearing rests upon and is supported by the cone 8.

A second cone 11, whose surface is plain and devoid of flutes, is threadedly received on the upper portion of the tube 6 and is screwed down until the cone firmly engages and seals the inner race of the outer bearing of the wheel 10.

Attached to the open, upper end of the tube 6 is a valve 12 having an angular fitting 13 to which is attached a flexible hose 14. The opposite end of the hose 14 is connected to a reservoir 15 which is designed to retain a grease solvent, as kerosene. Attached to the upper end of the reservoir 15 is a pipe or hose 16 leading to a source of air under pressure. A filler spout 17 is provided on the tank through which the grease solvent may be introduced into the reservoir. A screen 18 is provided in the upper end of the tube 6 at the lower end of the valve 12 for removing grit or other objectionable abrasive substances from the solvent or flushing oil as it is introduced into the wheel hub.

Flushing of the wheel hub and bearings to remove the old grease is accomplished by opening the valve 12. This permits the solvent or flushing oil in the reservoir 15 to be forced under air pressure into the tube 6. The solvent or flushing oil is expelled from the tube 6 under such air pressure through the apertures 7 into the hub of the wheel where it erodes, loosens and agitates the old grease. The old grease and the solvent escape from the wheel hub through the upper and lower bearings, and that portion of the flushing escaping through the lower bearing drops into the pan 20, discharge being facilitated by the provision of the flutes 9 of the cone 8.

After flushing, the solvent supply and valve 12 are detached from the tube 6 and the cone 11 retracted from the tube, after which the wheel 10 is removed. The tube 6, and the attached cone 8, are then removed from the base 1.

A grease injector tube 21 is then substituted for the flushing tube 6 in the nave 5 of the base 1. The grease injector tube 21 is somewhat similar to the construction of the flushing tube, being exteriorly threaded throughout its longitudinal extent except for a plain portion devoid of threads located midway between its ends. This plain portion is provided with a plurality of aligned perforations 22 whose diameters are preferably larger than the apertures 7 of the tube 6. The opposite ends of the tube 21 are closed, but the upper end is provided with a lubricating nipple 23 designed to accommodate the chuck of a grease tool or gun.

The tube 21 has a plain cone 25 threaded on its lower end in lieu of the fluted flushing cone 8. The wheel hub is placed in encircling relation about the tube 21 so that the inner race of the inner bearing rests upon and is supported by the cone 25. The cone 11 is then threaded on the upper end of the tube 21 and screwed down substantially tight against the inner race of the outer bearing. The chuck of the grease gun (not shown) is then applied to the nipple 23 and the fresh grease may thereby be forced into all parts of the hub and bearings under pressure through the perforations 22.

What is claimed is:

1. A device for lubricating the hub and bearings of an automobile wheel comprising a tube, a member received on said tube and adapted to underlie one of the hub bearings and support the wheel in encircling relation on said tube, a second member received on the tube and adapted to contact the other of said hub bearings, perforations in said tube adapted to be disposed within the hub of the wheel to be lubricated, and means for introducing a substance under pressure into said tube to be expelled therefrom through said perforations into the wheel hub.

2. A device for lubricating the hub and bearings of an automobile wheel comprising a tube adapted to have a portion of its longitudinal extent encircled by the hub of the wheel to be lubricated, a conical member received on said tube and adapted to contact one of the hub bearings, a second conical member adjustably received on said tube and adapted to contact the opposite hub bearing, perforations in that portion of the tube encircled by the wheel hub, and means for introducing a substance under pressure into said tube to be discharged therefrom through said perforations into the wheel hub.

3. A device for lubricating the hub and bearings of an automobile wheel comprising a tube adapted to have a portion of its longitudinal extent encircled by the hub of the wheel to be lubricated, a fluted conical member received on said tube and adapted to contact one of the hub bearings, a second conical member having a plain surface received on said tube and adapted to contact the opposite hub bearing, perforations in that portion of the tube encircled by the wheel hub, and means for introducing a substance under pressure into said tube to be discharged therefrom through said perforations into the wheel hub.

4. A device for lubricating the hub and bearings of an automobile wheel comprising a base, a tube supported by said base and adapted to have a portion of its longitudinal extent encircled by the hub of the wheel to be lubricated, a conical member received on said tube and adapted to contact one of the hub bearings, a second conical member received on said tube and adapted to contact the opposite hub bearing, perforations in that portion of the tube encircled by the wheel hub, means for introducing a substance under pressure into said tube to be expelled from said tube through said perforations into the wheel hub, and a receptacle to catch any of said substance which may be discharged from the wheel hub.

5. A device for lubricating the hub and bearings of an automobile wheel comprising a tube adapted to have a portion of its longitudinal extent encircled by the hub of the wheel to be lubricated, a tapered member received on said tube and adapted to engage and seal the inner race of one of the hub bearings, a second tapered member adjustably received on said tube and adapted to engage and seal the inner race of the opposite hub bearing, perforations in that portion of the tube encircled by the wheel hub, and means for introducing a substance under pressure into said tube to be discharged therefrom through said perforations into the wheel hub between the bearing seals.

CECIL JACKSON.